(12) United States Patent
Ansari et al.

(10) Patent No.: US 8,902,912 B2
(45) Date of Patent: Dec. 2, 2014

(54) DIFFERENTIAL FRAME BASED SCHEDULING FOR INPUT QUEUED SWITCHES

(75) Inventors: Nirwan Ansari, Montville, NJ (US); Jingjing Zhang, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 260 days.

(21) Appl. No.: 13/257,305

(22) PCT Filed: Nov. 3, 2010

(86) PCT No.: PCT/US2010/055294
§ 371 (c)(1),
(2), (4) Date: Sep. 18, 2011

(87) PCT Pub. No.: WO2011/056868
PCT Pub. Date: May 12, 2011

(65) Prior Publication Data
US 2012/0008637 A1 Jan. 12, 2012

Related U.S. Application Data

(60) Provisional application No. 61/258,097, filed on Nov. 4, 2009.

(51) Int. Cl.
*H04L 12/56* (2006.01)
*H04L 12/873* (2013.01)
*H04L 12/875* (2013.01)
*H04L 12/863* (2013.01)

(52) U.S. Cl.
CPC ............... *H04L 47/522* (2013.01); *H04L 47/56* (2013.01); *H04L 47/6215* (2013.01)
USPC ........................................................ 370/412

(58) Field of Classification Search
CPC ............................... H04L 49/90; H04L 47/10
USPC .............. 370/394.3, 395, 412–418, 428–429, 370/442–444, 447, 458.561–463
See application file for complete search history.

(56) References Cited

U.S. PATENT DOCUMENTS 7,660,973 B2  2/2010  Hansen et al.
7,688,820 B2  3/2010  Forte et al.
(Continued)

FOREIGN PATENT DOCUMENTS

CN    99121616 A    10/1999

OTHER PUBLICATIONS

IEEE Computer and Communications Societies, INFOCOM 2004, "A framework for differential frame-based matching algorithms in input-queued switches", Mar. 2004, total pages 11.*

(Continued)

*Primary Examiner* — Jeffrey M Rutkowski
*Assistant Examiner* — Peter Mak
(74) *Attorney, Agent, or Firm* — Turk IP Law, LLC

(57) ABSTRACT

A differential frame-based scheduling scheme is employed for input queued (IQ) switches with virtual output queues (VOQ). Differential scheduling adjusts previous scheduling based on a traffic difference in two consecutive frames. To guarantee quality of service (QoS) with low complexity, the adjustment first reserves some slots for each port pair in each frame, then releases surplus allocations and supplements deficit allocations according to a dichotomy order, designed for high throughput, low jitter, fairness, and low computational complexity.

20 Claims, 8 Drawing Sheets

(56) References Cited

U.S. PATENT DOCUMENTS

| | | | |
|---|---|---|---|
| 7,707,621 B2 | 4/2010 | Walmsley | |
| 7,730,287 B2 | 6/2010 | Hansen et al. | |
| 7,758,143 B2 | 7/2010 | Silverbrook et al. | |
| 7,760,716 B2 | 7/2010 | Beshai | |
| 7,768,951 B2 | 8/2010 | Kubler et al. | |
| 7,770,008 B2 | 8/2010 | Walmsley | |
| 7,773,536 B2 | 8/2010 | Lloyd et al. | |
| 7,773,741 B1 | 8/2010 | LeBlanc et al. | |
| 7,783,886 B2 | 8/2010 | Walmsley | |
| 7,804,849 B2 | 9/2010 | Mahany et al. | |
| 7,808,503 B2 | 10/2010 | Duluk, Jr. et al. | |
| 7,817,627 B2 | 10/2010 | Beshai | |
| 7,818,519 B2 | 10/2010 | Plunkett | |
| 7,818,548 B2 | 10/2010 | Hansen et al. | |
| 7,822,005 B2 | 10/2010 | Ptasinski et al. | |
| 2003/0227901 A1* | 12/2003 | Kodialam et al. | 370/351 |
| 2005/0089054 A1* | 4/2005 | Ciancaglini et al. | 370/412 |
| 2005/0141804 A1* | 6/2005 | Yang et al. | 385/17 |
| 2007/0280261 A1 | 12/2007 | Szymanski | |
| 2009/0316716 A1* | 12/2009 | Tanaka | 370/458 |

OTHER PUBLICATIONS

IEEE Computer and Communications Societies, INFOCOM 2004, "A framework for differential frame-based matching algorithms in input-queued switches", Mar. 2004, total pp. 11.*

M. Karol et al., "Input Versus Output Queueing on a Space-Division Packet Switch," IEEE Transactions on Communications, vol. 35, pp. 1347, 1987.

N. McKeown et al., "Achieving 100% throughput in an input-queued switch," in Proc. IEEE INFOCOM, vol. 1, Mar. 1996, pp. 296-302.

S. Li et al., "Input-queued switching with QoS guarantees," in INFOCOM '99, vol. 3, pp. 1152-1159.

Zhang et al., On Differential Scheduling Input-Queued Switches with Guaranteed QoS and Low Complexity, Advanced Networking Laboratory, NJIT, Newark, NJ 07012, USA.

J. C. R. Bennett et al., "Delay jitter bounds and packet scale rate guarantee for expedited forwarding," IEEE/ACM Transactions on Networking, vol. 10, pp. 529-540, 2002.

Y. Mansour et al., "Jitter Control in QoS Networks", IEEE/ACM Transaction on Networking, vol. 9, No. 4, 2001.

I. Keslassy et al., "On guaranteed smooth scheduling for input-queued switches," IEEE/ACM Transactions on Networking, vol. 13, pp. 1364-1375, 2005.

N. McKeown, "The iSLIP scheduling algorithm for input-queued switches," IEEE/ACM Transactions on Networking, vol. 7, pp. 188-201, 1999.

C.S. Chang et al., "Birkhoff-von Neumann input buffered crossbar switches," in IEEE INFOCOM, vol. 3, pp. 1614-1623, 2000.

A. Bianco et al., "A Framework for Differential Frame-Based Matching Algorithms in Input-Queued Switches", in IEEE Infocom, pp. 1147-1157, 2004.

B. Tsybakov et al., "On Self-Similar Traffic in ATM Queues: Definitions, Overflow Probability Bound, and Cell Delay Distribution", IEEE/ACM Transaction on Networking, vol. 5, No. 3, pp. 397-409, 1997.

P.Giacconr et al., "Towards simple, high-performance schedulers for high-aggregate bandwidth switches". IEEE INFOCOM'02, New York, NY, pp. 1160-1169, vol. 3, 2002.

T. T. Lee et al., "Path switching—a quasi-static routing scheme for large-scale ATM packetswitches," IEEE Journal on Selected Areas in Communications, vol. 15, pp. 914-924, 1997.

S. R. Mohanty et al., "Guaranteed smooth switch scheduling with low complexity," in IEEE Globecom, vol. 1, 2005.

Parekh et al., "A Generalized Processor Sharing approach to Flow control in Integrated Services Networks: The Single Node Case". Proceedings of IEEE Infocom 1992.

C. Guo, "SRR: An O(1) Time-Complexity Packet Scheduler for Flows in Multiservice Packet Networks," IEEE/ACM Transactions on Networking, vol. 12, pp. 1144-1155, 2004.

J. Bennett et al., "WF2Q: Worst-case fair weighted fair queuing," in IEEE Infocom 96, 1996,pp. 120-128.

D. Wei et al., "Guaranteeing service rates for cell-based schedulers with a grouping architecture," in IEEE Proc. Communications, vol. 150, 2003.

A. Demers et al., "Analysis and simulation of a fair queueing algorithm," in ACM SIGCOMM, 1989.

M. Shreedhar et al., "Efficient fair queuing using deficit round robin," IEEE Transactions on Networking, vol. 4, No. 3, pp. 375-385, 1996.

C. Bogdan et al., "Group round robin: improving the fairness and complexity of packet scheduling", Proceedings of the 2005 symposium on Architecture for networking and communications systems, pp. 29-40, 2005.

M.Choy et al., " Huffman Fair Queuing: A Scheduling Algorithm Providing Smooth Output Traffic", in IEEE ICC 2006, pp. 796-799.

S. Mneimneh et al., "On achieving throughput in an input-queued switch," IEEE/ACM Transactions on Networking, vol. 11, pp. 858-867, 2003.

"A framework for differential frame-based matching algorithms in input-queued switches," A Bianco, Twenty-third Annual Joint Conference of the IEEE Computer and Communications Societies INFOCOM 2004), vol. 2, (Mar. 2004) pp. 1147-1157 A publication on frame-based scheduling.

"An efficient packet scheduling algorithm with deadline guarantees for input-queued switches," Y Lee et al, IEEE/ACM Transactions on Networking, vol. 15 , Iss 1 (2007), pp. 212-225.

Y. Lee et al, IEEE/ACM Transactions on Networking, vol. 15 , Iss 1 (2007), pp. 212-225.

International Search Report and Written Opinion PCT/US10/55294 mailed Aug. 19, 2011.

Rendl, F., "On the complexity of decomposing matrices arising in satellite communication," Operations Research Letters, vol. 4, Issue 1, pp. 5-8 (May 1985).

Chinese Foreign Office Action mailed Mar. 31, 2014 for 201080048846.2.

* cited by examiner

DIFFERENTIAL FRAME BASED SCHEDULING FOR INPUT QUEUED SWITCHES

CROSS REFERENCE TO RELATED APPLICATIONS

This Application is the National Stage filing under 35 US.C. §371 of PCT Application Ser. No. PCT/US10/55294 filed on Nov. 3, 2010, which claims the benefit under 35 US.C. §119(e) of U.S. Provisional Patent Application Serial No. 61/258,097 filed on Nov. 4, 2009. The disclosures of the PCT Application and the U.S. Provisional Patent Application are hereby incorporated by reference in their entireties.

BACKGROUND

Unless otherwise indicated herein, the materials described in this section are not prior art to the claims in this application and are not admitted to be prior art by inclusion in this section.

A network can be modeled as a fabric of switches that route traffic. If the internal speedup of the switch fabric is one and the time is slotted, cell transfer is subjected to the unique pairing constraint that one cell can depart from an input and also one cell can arrive at one output in a time slot. As a result, scheduling is needed to compute the matching between inputs and outputs before cell transmission. With the rapid increase of real-time applications, such as video and voice, stricter requirements are imposed on scheduling algorithms, which are required to possess low computational complexity, and to achieve good performances in terms of throughput, delay, delay jitter and fairness.

Formerly, slot-by-slot matching algorithms such as maximum size matching (MSM) were proposed to maximize throughput performance in each time slot. These schemes typically compute the matching in each time slot based on the collected information of input queues and impose strict requirements on the computational complexity of matching algorithms, one of the major scalability issues in designing high-speed routers with a large switch size. In frame-based matching schemes for computing the input/output matching frame by frame, each frame is composed of a number of consecutive slots. These schemes reduce the frequency of computing the matching from every time slot to every frame.

SUMMARY

The present disclosure describes a method for scheduling input queued switches in a network environment. According to some examples, the method may include dedicating a predefined portion of available time slots to each switch port pair, where a switch port pair is not subject to scheduling constraints within its dedicated time slot and removing allocations of dedicated time slots according to a predefined order. The method may further include supplementing allocations of dedicated time slots according to the predefined order and enabling switch port pairs to borrow dedicated time slots of other switch port pairs.

The present disclosure further provides an apparatus for scheduling input queued switches in a network environment. According to some examples, the apparatus may include a memory configured to store instructions and also store network information data associated with switch port pairs directing network traffic and a processor coupled to the memory, where the processor is adapted to execute the instructions, which when executed configure the processor to dedicate a predefined portion of available time slots to each switch port pair, where a switch port pair is not subject to scheduling constraints within its dedicated time slot and remove allocations of dedicated time slots according to a predefined order. The processor may also supplement allocations of dedicated time slots according to the predefined order and enable the switch port pairs to borrow dedicated time slots of other switch port pairs.

The present disclosure also describes a computer-readable storage medium having instructions stored thereon for scheduling input queued switches in a network environment in a differential frame-based manner. According to further examples, the instructions may include dedicating a predefined portion of available time slots to each switch port pair, where a switch port pair is not subject to scheduling constraints within its dedicated time slot, and removing allocations of dedicated time slots according to a predefined order. The instructions may further include supplementing allocations of dedicated time slots according to the predefined order and enabling switch port pairs to borrow dedicated time slots of other switch port pairs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
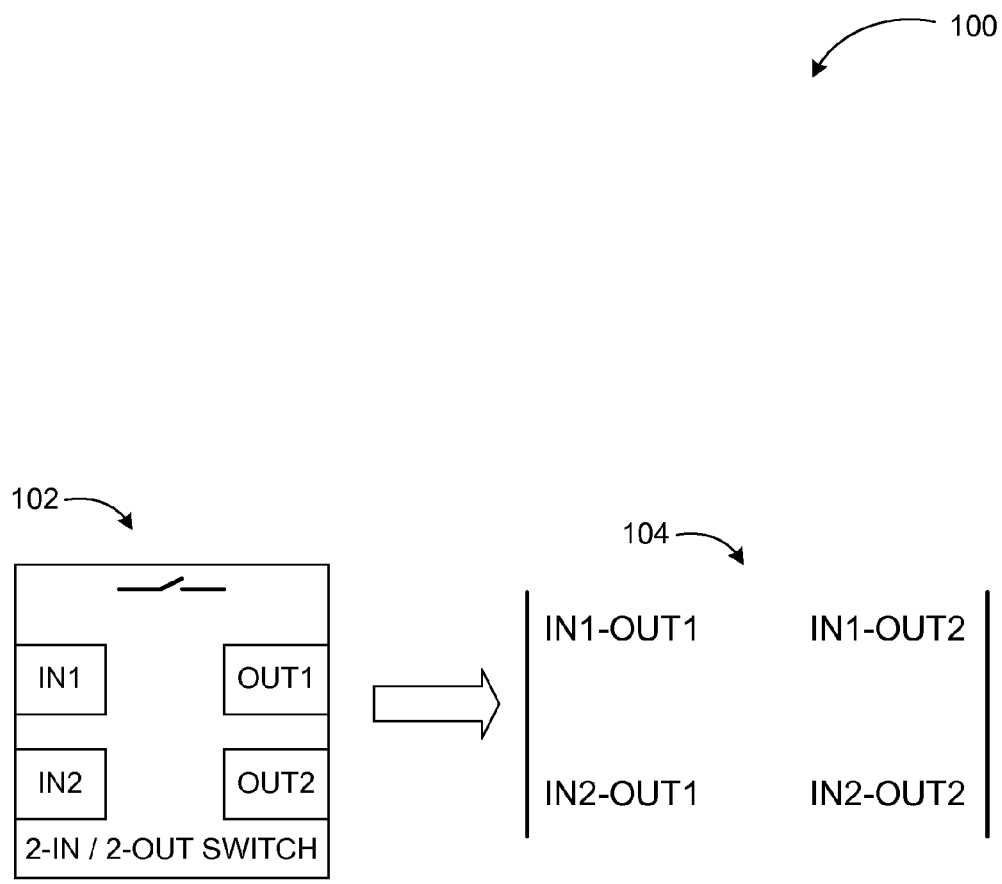
FIG. 1 illustrates an example 2-in/2-out switch pair and various permutation matrices for the switch pair.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to differential frame based scheduling for input queued switches.

Briefly stated, a differential frame-based scheduling scheme may be employed for input queued (IQ) switches with virtual output queues (VOQ). Differential scheduling may adjust previous scheduling based on a traffic difference in two consecutive frames. To guarantee quality of service (QoS) with low complexity, the adjustment may first reserve some slots for each port pair in each frame, then release surplus allocations and supplement deficit allocations according to a dichotomy order, designed for high throughput, low jitter, fairness, and low computational complexity.

FIG. 1 illustrates an example 2-in/2-out switch pair and various permutation matrices for the switch pair arranged in accordance with at least some embodiments described herein. Input-queued (IQ) crossbar switch fabric with virtual output queues (VOQ) is a recent approach in the designing of high speed routers and switches. In such a switch fabric, the arriving packets are queued in front of the inputs according to their destination ports, referred to as virtual output queue. As compared to the conventional IQ or output queuing (OQ) scheme, IQ with VOQ scheme overcomes the poor scalability of the output queuing scheme. On the other hand, IQ with VOQ avoids the performance degradation due to the well-known head-of-line (HOL) blocking problem in existing input queuing schemes.

Slot-by-slot matching algorithms such as maximum size matching (MSM) may be used to maximize throughput performance in each time slot for switch operations. These schemes compute the matching in each time slot based on the collected information of input queues. They impose strict requirements on the computational complexity of matching algorithms, one of the major scalability issues in designing high-speed routers with a large switch size. Frame-based matching schemes compute the input/output matching frame by frame, where each frame is composed of a number of consecutive slots. They reduce the frequency of computing the matching from every time slot to every frame. To further reduce the computational time, differential frame-based scheduling may be used. The data traffic in networks obeys long term dependence and possesses self-similarity property. Such traffic correlation between two successive frames forms the basis of differential frame-based scheduling. Rather than computing the matching from scratch in every frame, differential frame-based scheduling regards the schedule in the previous frame as the schedule for the current frame by default. Then, it adjusts the schedule to meet the traffic demand in the current frame. Since the traffic difference in two consecutive frames is normally less than the absolute traffic in one frame, the computational burden is relieved.

Design goals in network traffic allocation for IQ switches include lower computational time, higher throughput, lower delay jitter, and fairness. Optimized throughput may be achieved by decomposing the traffic demand matrix into a weighted combination of permutation matrices with a theoretical minimum total weight. Each of the permutation matrices may correspond to a matching in a slot. In considering delay jitter and fairness performance, Greedy Low jitter Decomposition (GLJD) algorithm may be employed. Also decomposing the traffic matrix into a combination of permutation matrices, GLJD algorithm adds an additional constraint of non-overlapping positions of nonzero entries in the decomposed permutation matrices. After decomposition, a Weighted Round Robin (WRR) scheme may be adopted to schedule these decomposed matrices. Alternatively, Binary Matrix Decomposition (BMD) algorithm with a Smoothed Round Robin (SRR) may also be used to schedule these decomposed matrices. However, port pairs are sometimes granted with more allocations than the requirement in GLJD and BMD. Also referred to as over-allocation, this phenomenon may entail unexpected high jitter and unfairness even if the decomposed permutation matrices are ideally scheduled.

As shown in diagram 100, connections for a switch pair 102 with two inputs, IN1 and IN2, and two outputs, OUT1 and OUT2, may be represented as a permutation matrix 104 containing possible input-output connections. For example, in a frame period of eight time-slots, 1, 2, . . . , 8, the traffic demand of a 2×2 switch may be described by T, where Ti,j is the required slots for transmitting traffic from input i to output j. Assuming an example scenario of $$T_{2\times 2} = \begin{bmatrix} 4 & 4 \\ 4 & 2 \end{bmatrix} \quad [1]$$

Port pairs (1,1), (1,2), and (2,1) have four packets to be transmitted while port pair (2,2) has only 2 packets to be transmitted. BV and GLJD decomposition generate the following weighted sum of permutation matrices:

$$\begin{bmatrix} 4 & 4 \\ 4 & 2 \end{bmatrix} < 4 \begin{bmatrix} 1 & 0 \\ 0 & 1 \end{bmatrix} + 4 \begin{bmatrix} 0 & 1 \\ 1 & 0 \end{bmatrix},$$

where < means that each entry in the right is no less than the corresponding entry in the left. Then, the two decomposed permutation matrices may be scheduled with equal interval of two slots as:

$$\text{perm. matrix} \quad \begin{bmatrix} 1 & 0 \\ 0 & 1 \end{bmatrix}\begin{bmatrix} 0 & 1 \\ 1 & 0 \end{bmatrix}\begin{bmatrix} 1 & 0 \\ 0 & 1 \end{bmatrix}\begin{bmatrix} 0 & 1 \\ 1 & 0 \end{bmatrix}\begin{bmatrix} 1 & 0 \\ 0 & 1 \end{bmatrix}\begin{bmatrix} 0 & 1 \\ 1 & 0 \end{bmatrix}\begin{bmatrix} 1 & 0 \\ 0 & 1 \end{bmatrix}\begin{bmatrix} 0 & 1 \\ 1 & 0 \end{bmatrix}$$

slot: 1 2 3 4 5 6 7 8

Port pair, which only needs two slots, is granted four slots, i.e., 1, 3, 5, 7. The usual scheme for scheduling is to choose the earliest two slots, slots 1 and 3. Under this case, the interval (time difference) between these two allocations is two slots, while the interval between the second allocation and the allocation in the next frame is no less than six slots, thus resulting in high jitter. Instead, choosing slots 1 and 5 may produce lower delay jitter. Moreover, over-allocation also entails short-term unfairness among port pairs since 100% of the traffic of port pair are transmitted during the first four slots while only 50% of the traffic of other port pairs is transmitted in the same time.

To avoid the unexpected high jitter and unfairness brought by over-allocation, Differential Dichotomy Slot Allocation (DDSA) may be employed, according to some embodiments, to allocate exactly the amount of slots to accommodate the traffic demand of each port pair. Specifically, DDSA performs the following operations in order to achieve good performances. Firstly, DDSA decouples the tightly coupled port pairs by dedicating some slots for each port pair. Within its dedicated slots, the port pair is no longer subject to the scheduling constraints. This operation may reduce the computational complexity in the adjustment process. Secondly, DDSA may remove and supplement allocations in the dedicated slots according to a specially designed order, which helps DDSA achieve good performances. Thirdly, to achieve high throughput, DDSA may allow port pairs borrow dedicated slots of other port pairs.

Instead of constructing the scheduling from scratch, DDSA regards the schedule in the last frame as the schedule for the current frame by default. Then, according to the traffic difference in the two frames, DDSA may adjust the schedule to meet the actual traffic demand for the current frame. Generally, the adjustment may include two steps. If the request in a frame is less than that in a preceding frame, redundant allocations may be removed from schedule, $S^O$, and deficit allocations may be supplemented into $S^O$ otherwise. A scheduling algorithm according to some embodiments may remove and supplement allocations with low complexity and simultaneously maintain high throughput, jitter, and fairness performances.

Because two port pairs with the same input or output port cannot be allocated with the same slot, port pairs are tightly coupled with each other adding complexity in the removing and supplementing processes. Thus, DDSA may decouple these tightly coupled port pairs. An algorithm according to embodiments may dedicate some time slots for each port pair. Within the dedicated slots, the port pair is no longer subject to the constraints. In other words, any of the dedicated slots can be used for scheduling in each frame, hence reducing the time involved in searching for suitable slots. Moreover, allocations in dedicated slots may be removed and supplemented according to a specially designed order, which helps DDSA achieve good performances. Furthermore, DDSA may enable port pairs to borrow dedicated slots of the other port pairs when necessary so as to optimize throughput.

As discussed above, a DDSA algorithm according embodiments may dedicate a set of slots to each port pair in order to save time in searching for allocation slots. Within their corresponding dedicated slots, the port pairs are decoupled and no longer subject to the constraints that a port cannot send to or receive from more than one port simultaneously. In each frame, the port pairs may arbitrarily select any dedicated slots, implying low complexity in selection. Generally, the dedicated slots of a port pair may satisfy the following criteria. First, the dedicated slots of port pairs with the same input or output may not be overlapped. Second, the number of the dedicated slots of a port pair may be able to accommodate its traffic demand.

To satisfy the first criterion, the DDSA may group the port pairs such that the port pairs in the same group do not have the same input or output. Then, the DDSA may assign dedicated slots group by group. For the second criterion, DDSA may try to dedicate more slots to port pairs with larger traffic demands. Specifically, DDSA may group the port pairs with similar traffic demand into the same group, and then assign the dedicated slots based on the traffic demands of the port pairs within the group.

Letting $G_k$ describe port pairs in group k, the three-dimensional Boolean variable $G^k_{i,j}$ equals 1 if (i,j) belongs to group k, and equals 0 otherwise. By grouping, the constraints may be formulated as:

$$\overset{N}{\underset{i=1}{a}} G^k_{i,j} = 1, \text{" } j, k, \text{ and} \quad [2]$$

$$\overset{N}{\underset{i=1}{a}} G^k_{i,j} = 1, \text{" } i, k. \quad [3]$$

According to some embodiments, long-term statistical traffic arrival rate information may be used to decide dedicated slots. Letting $l_4$, be the statistical traffic rate of port pair (i,j), DDSA may minimize the total variance of traffic arrival rates of port pairs in groups for the second criterion. Denoting $var_k$ as the variance of traffic arrival rates of port pairs in group k, $var_k = var\{l_{i,j}|G^k_{i,j}=1\}$ a grouping may be found that minimizes the variance of traffic arrival rates in all groups, i.e., $$\min\left(\overset{a}{\underset{k}{}} var_k\right).$$

A greedy low jitter decomposition algorithm (GLJD) may be employed to divide port pairs into groups. Port pairs may first be sorted in an ascending order of the incoming traffic rate, and then port pairs with no same input or output may be grouped into one matrix according to the order.

Defining $r_k$, the maximum rate of port pairs in group k, as $r_k = \max\{l_{i,j}|G^k_{i,j}=1, \text{"i,j}\}$, the rate may be used as the weight of group k in assigning L slots to groups. The number of dedicated slots of port pair (i, j) in group k, denoted as $A_{i,j}$, is then either $$\left\lfloor L * r_k / \sum_{k=1}^{N} r_k \right\rfloor \text{ or } \left\lceil L * r_k \sum_{k=1}^{N} r_k \right\rceil.$$

For good jitter and short-term fairness performance, fairness packet scheduling or similar algorithms may be adopted. A DDSA according to embodiments may apply the worst-case weighted fair queuing ($WF^2Q$) to assign the slots to the groups. Thus, the process of deciding dedicated slots may be summarized as:

Step 1: Group port pairs by using GLJD. Let $r_k = \max\{l_{i,j}|G^k_{i,j}=1, \text{"i,j}\}$, i.e., $r_k$ is the maximum traffic arrival rate of port pairs in group k.

Step 2: Regarding $r_k$ as the weights, assign the slots to each group by using $WF^2Q$. Thus, port pairs in the same group possess the same dedicated slots.

Figure 2:
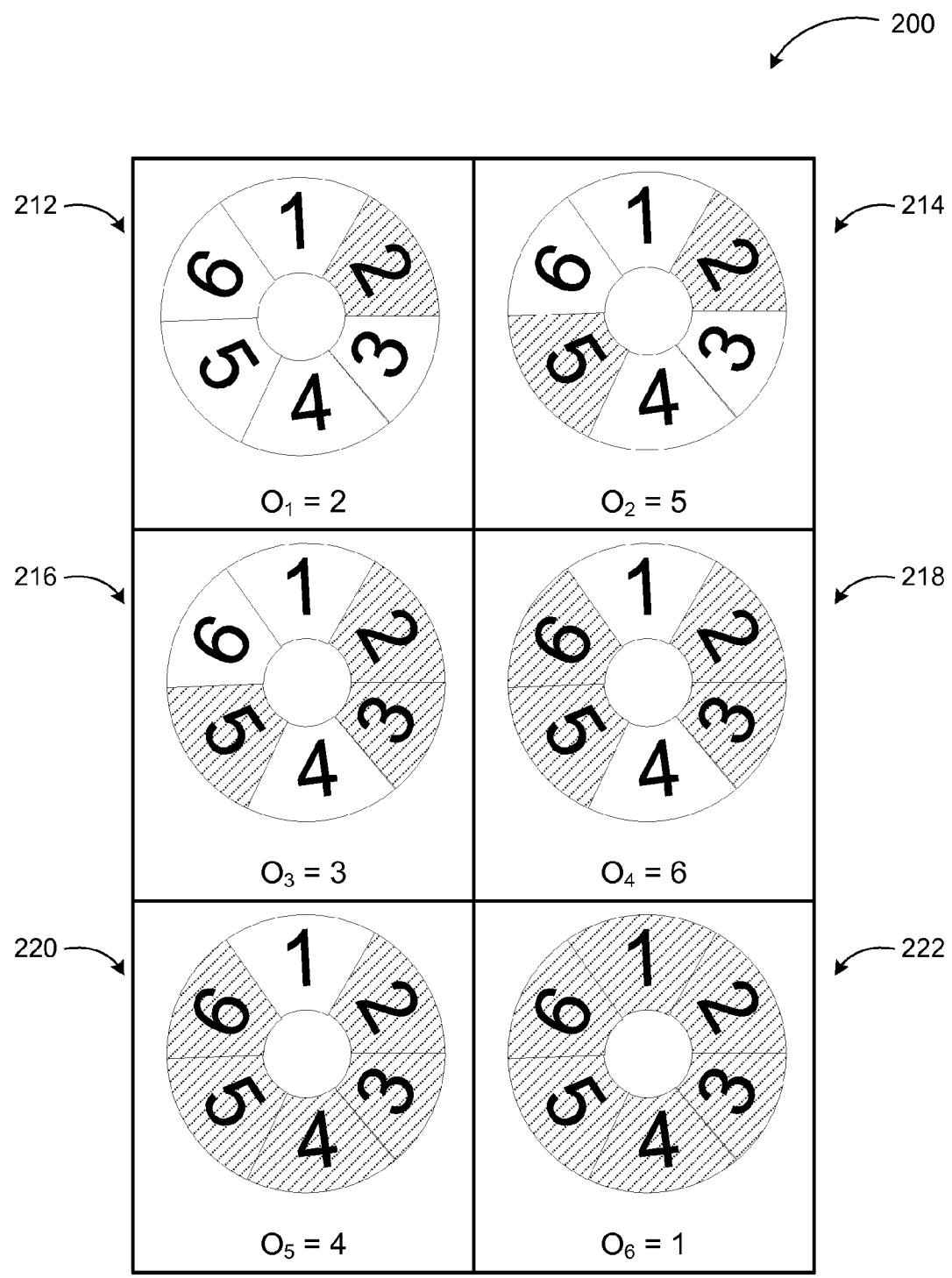
FIG. 2 illustrates an example for generating a dichotomy order, O, for a circular array with a length of 6.

FIG. 2 illustrates an example for generating a dichotomy order, O, for a circular array with a length of 6. Not all the dedicated time slots may always be allocated for a given port pair. To avoid the over-allocation, time slots may be selected when the requirement is less than the number of dedicated slots. To guarantee performances, the slot selection may be based on an order. The order, on one hand, may enable the algorithm to be implemented in a differential way. On the other hand, the order may help achieve high throughput, low jitter, as well as short-term fairness. According to some embodiments, a dichotomy order may be employed for selection of dedicated slots.

Dichotomy order, denoted by O, may be considered as an operation order on a circular array. Given a circular array B with the length M and the first m operation positions, $O_1, O_2, \ldots, O_m$, in the array, the next M-m operation positions in the array may be determined. The determining rule may be as follows: every new operation position on B is the middle position of the longest section of B divided by its formerly determined elements. The generation process of O may be expressed as an algorithm:

% Input: M, $O_1, \ldots, O_m$; Output: $O_{m+1}, \ldots, O_N$
  Compute the intervals separated by $O_1, \ldots, O_m$
  For k=m+1, ..., M
    $O_k$ is the middle position of the maximum interval
    Recompute the intervals separated by $O_1, \ldots, O_k$ Diagram 200 illustrates an example dichotomy order generation using the circular array model. In first step 212, $O_1$ is selected as element 2. Following the algorithm, $O_2$ is selected as element 5 in second step 214. This is followed by selection of element 3 for $O_3$ at step 216. Instead of 3, elements 4, 1, or 6 may also be selected with similar results. Once element 3 is selected, however, its opposite element 6 is selected for $O_4$ at step 218. At step 220, element 4 is selected for $O_5$, which could also be element 1 following the algorithm. In final step 222 of the example scenario, element 1 is selected for $O_6$.

For the selection from the dedicated slots, the allocations of port pair (i j) may be either removed or supplemented based on a dichotomy order. Denoting $O^{i,j}$ as the specific dichotomy order of port pair (i,j), $O^{i,j}$ may be generated with length $A_{i,j}$ for port pair (i,j). The selection process from dedicated slots may be expressed as an algorithm:

% generate dichotomy orders for all the port pairs, denoted as $O^{i,j}$, "(i,j)
  for $T_{i,j}^1 < A_{i,j}$, $T_{i,j}^0 < A_{i,j}$
    if $T_{i,j}^1 < T_{i,j}^0$
      remove allocations in the $O^{i,j}[T_{i,j}^1+1]$th, ..., $O^{i,j}[T_{i,j}^0]$th dedicated slots of (i,j) else if $T_{i,j}^1 > T_{i,j}^0$
      supplement allocations in the $O^{i,j}[T_{i,j}^0+1]$th, ..., $O^{i,j}[T_{i,j}^1]$th dedicated slots of (i,j)

In practical applications, bursts are common. The dedicated slots of a port pair may not be able to accommodate the incoming bursts. To accommodate bursts, a DDSA algorithm according to embodiments may enable a port pair to borrow dedicated slots from other port pairs for scheduling so as to optimize throughput. When one port pair borrows dedicated slots from other port pairs, its scheduling interval may be decreased, and the jitter may likely be decreased. Generally, port pairs which borrow slots may not have large jitter. To locate sufficient suitable slots to accommodate the burst, following scheme may be employed.

For port pair (i,j) with $T_{i,j} > A_{i,j}$, a slot besides the dedicated slots may be suitable for its allocation if both input i and output j are idle in the slot. These suitable slots may be located by checking all L slots one-by-one, which may be time-consuming. Unsuitable slots may, however, be ruled out reducing the checking range and saving time. After a slot is lent to (i,j), it cannot be borrowed by other port pairs with input i or output j. That is, if a port pair borrows slots earlier, its cells can have a larger chance to be scheduled. In terms of throughput, the port pair which borrows earlier may be given higher priority over those which borrow later. For fairness, the port pairs with the ascending order of the throughput may be sorted first. Then, the port pairs may be enabled to borrow one by one according to the order. Letting, $T_{i,j}^c$, $TP_{i,j}^c$ track the real-time scheduled traffic and the real-time throughput of port pair (i,j), respectively, the formula may be defined as:

$$TP_{i,j}^c = T_{i,j}^c / T_{i,j}^1. \quad [4]$$

If the dedicated slots of a port pair are lent to others during the former frame, the property that port pairs are not subject to the constraints discussed above in their dedicated slots may no longer hold true in the current frame. To keep the property true, a rule may be set that a port pair can take back its dedicated slots any time. The borrowing process from dedicated slots may be expressed as an algorithm:

$\overline{\pi}$ is the set containing the ruled-out slots that is unsuitable for (i,j)
  % initialization
  for $T_{i,j}^1 > T_{i,j}^c$
    $TP_{i,j}^c = T_{i,j}^c / T_{i,j}^1$ % $TP^c$ is the throughput before borrowing
    initialize $\pi_{i,j}$ by using Property 1
  % borrow
  sort (i,j) with the ascending order of $TP^c$
  for (i,j) in the order
    search for slots in $\overline{\pi}_{i,j}$ to supplement the allocations
    update $TP_{i,j}^c, \pi_{i,j}$ Thus, a DDSA algorithm according to embodiments may be summarized as shown below, where $T^0$ is the traffic in the former frame 0, $T^1$ is the traffic in the current frame 1, and $T^c$ tracks the real-time scheduled traffic with initially, $T^c=T^0$.

decide dedicated slots, and generate dichotomy orders for each port pair
  $T^c = T^0$
  % port pairs take back its dedicated slots
  for (i,j) with $T_{i,j}^1 > T_{i,j}^c$ and $A_{i,j} > T_{i,j}^c$
    $m = \min(T_{i,j}^1, A_{i,j})$
    supplement allocations in slots $O^{i,j}[T_{i,j}^0+1], \ldots, O^{i,j}[m]$ (a)
    update $T^C$ (b)
  % port pairs remove over-allocations
  for (i,j) with $T_{i,j}^1 < T_{i,j}^c$
    remove allocations with the rule that the last selected removed first (c)
    $T_{i,j}^c = T_{i,j}^1$
  % port pairs borrow dedicated slots of other port pairs
  for (i,j) with $T_{i,j}^1 > T_{i,j}^c$
    borrow dedicated slots of other port pairs (d)

In DDSA, port pairs may first take back dedicated slots lent to other port pairs, as shown in steps (a) and (b) in the above algorithm. These two steps enable port pairs to use their dedicated slots with the highest priority. Step (b) is to update the scheduled real-time traffic $T^c$, including not only port pairs whose allocations have been supplemented, but also those with allocations having been removed. Step (c) is to remove over-allocations in the current frame. Step (d) is to let port pairs with requests exceeding the capacity of their dedicated slots borrow dedicated slots from other port pairs. The above described algorithm is an example and does not constitute limitation on embodiments. An order of steps may be modified, some steps may be omitted, or other steps added in a differential frame based scheduling algorithm for input queued switches.

In order to ensure that the reserved slots of port pair (i,j) serve itself first, thereby guaranteeing long-term fairness, if other port pairs with input i or output j uses the slot in last frame, its traffic may be chased out. Chased traffic nearly has no impact on the throughput performance for two main reasons. Firstly, the port pair with chased traffic may have smaller traffic demand in the current frame. The chased traffic may play a positive role in making $T^c$ approach the real traffic. Secondly, if needed, the chased traffic may be scheduled in the subsequent steps.

A "last allocated, first released" rule may be employed for releasing allocations for port pair (i,j). Specifically, allocations in slots other than reserved slots may be released first, then allocations in reserved slots in the reverse order of slot selection order.

For port pair (i, j) with some more traffic, additional slots, where input i and output j are both idle, need to be located and allocated to the port pair. Since a number of slots, $A_{i,j}$, have already been reserved for port pair (i,j) in group k, the searching scope may be reduced to the remaining $L-A_{i,j}$ slots, where L is the total available slots. For the purpose of low jitter, fairness as well as future differential implementation, dichotomy order may be adopted to supplement allocations. More specifically, a dichotomy order, denoted as SO, is applied to search for idle slots. For port pair (i, j) in group k, SO is generated with length L and the first $A_{i,j}$ elements equal to the $A_{i,j}$ reserved slots of port pair (i,j).

Next, a determination may be made whether input i and output j are both idle in the slots with the order of SO. If input i or output j is already busy, the slot may not be allocated to port pair (i, j) any more. Thus, the attempt of allocating this slot to port pair (i, j) fails. The attempt failure rate should be low in order to reduce the searching time.

Generally, candidate slots to supplement deficit allocations change with the variation of traffic demands in specific frames. However, under the weak constant and strong constant traffic model, the candidate slots may not change too much with the small variation of traffic demands. As a result, given a port pair, the slots may be divided into two classes based on the statistical traffic demand. The divided two classes may be: the first group of slots, which more likely have the ability of supplementing deficit allocations, and the second group of slots, which are less likely to supplement deficit allocations. Since the slot searching order is determined based on the statistical traffic rate, online computing is not necessary.

Figure 3:
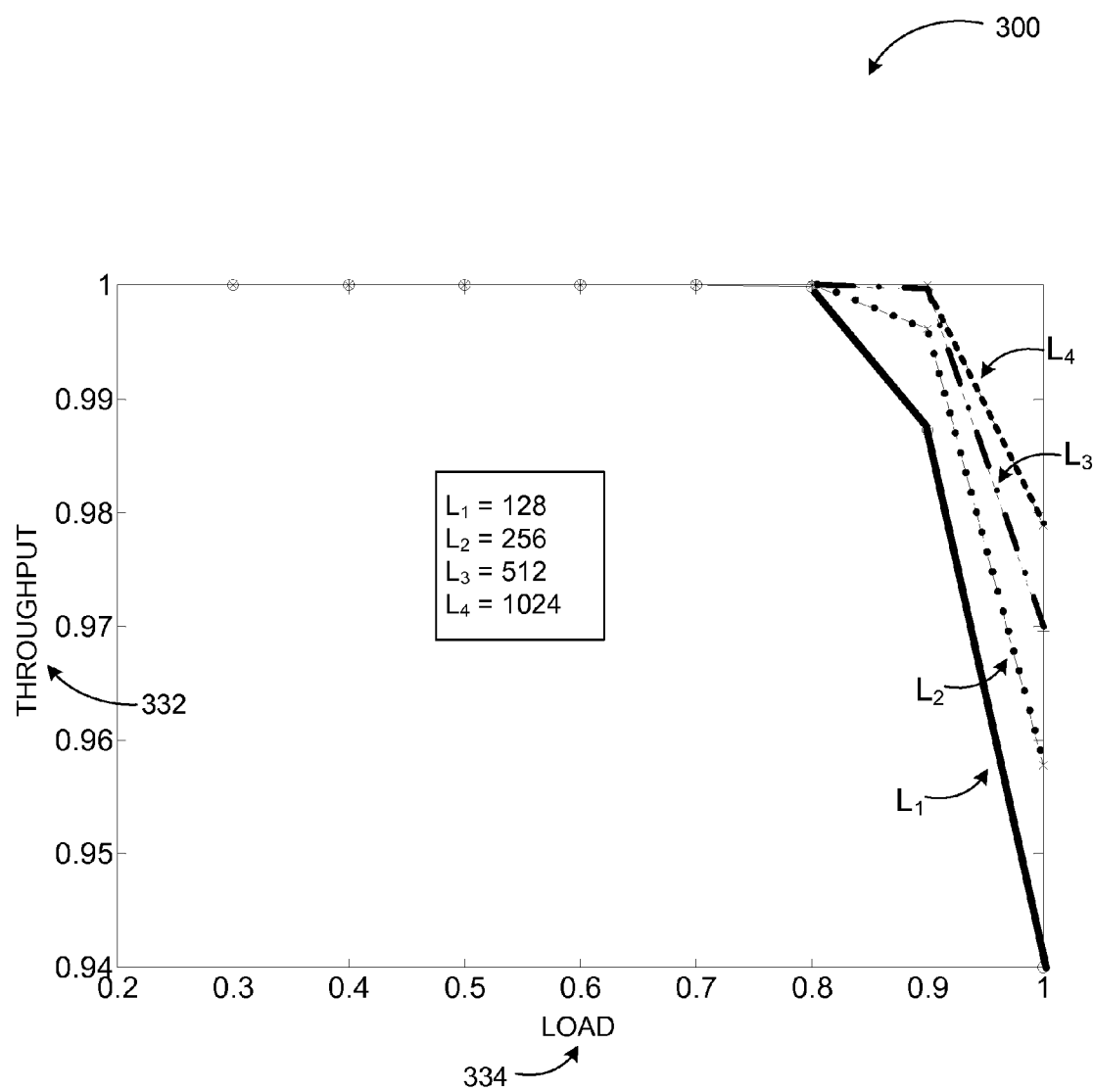
FIG. 3 illustrates a comparison of throughput performance vs. traffic load in a system according to at least some embodiments under stationary uniform traffic with different frame lengths.

FIG. 3 illustrates a comparison of throughput performance vs. traffic load in a system according to at least some embodiments under stationary uniform traffic with different frame lengths. Under uniform scenarios, the traffic rate may be expressed as:

$$\lambda_{i,j}=\rho/N, \forall i,j, \quad [5]$$

where $\rho$ denotes the normalized input load. Diagram 300 considers the cases with the frame length $L_1=128$ slots, $L_2=256$ slots, $L_3=512$ slots, and $L_4=1024$ slots, respectively. Based on the uniform traffic rate, the port pairs may be divided into 32 groups, and each of which possess L/32 dedicated slots. The intervals between two consecutive dedicated slots of each port pair are uniform.

When the throughput performance 332 is compared against the load 334 with different frame sizes, it can be seen that the throughput reaches 100% when the load is less than 0.8. As the load becomes 1, the throughput drops to 0.975 for the frame size of $L_4=1024$ slots, and 0.94 for the frame size of $L_1=128$ slots, respectively. The dropping ratio in the case of a large frame size is smaller than that in the case of a small frame size. This may be due to the fact that the incoming traffic in a frame is the sum of L i.i.d. random processes corresponding to the L slots in a frame. It approaches the statistical arrival rate as the frame size increases (L is large), according to the law of large number. Since the dedicated slots are decided based on the average traffic rate, the closer the traffic approaches the traffic average rate, the less likely the cells exceed the capacity of their dedicated slots. Thus, the dropping ratio is small.

Figure 4:
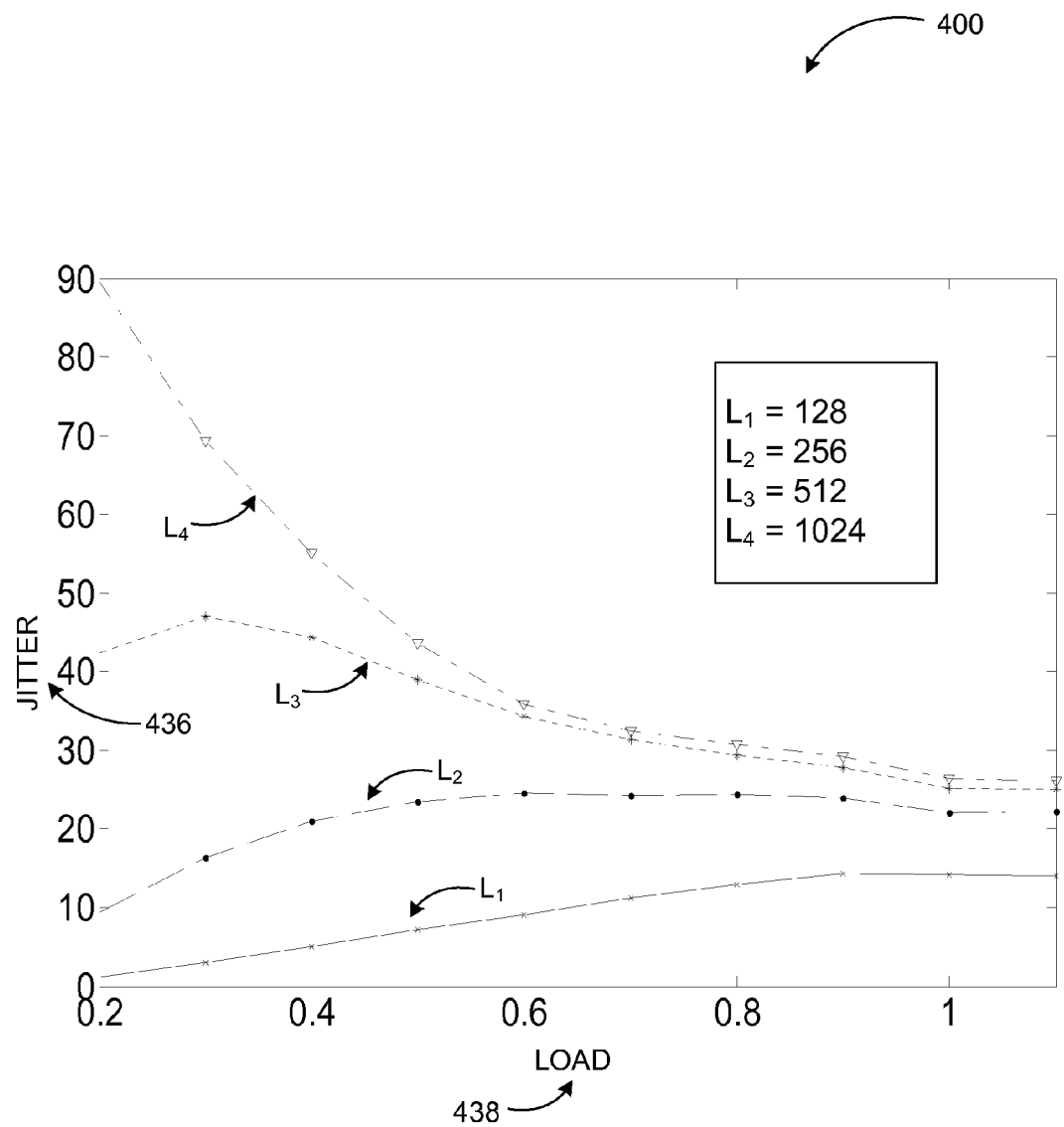
FIG. 4 illustrates a comparison of jitter performance vs. traffic load in a system according to at least some embodiments under stationary uniform traffic with different frame lengths.

FIG. 4 illustrates a comparison of jitter performance vs. traffic load in a system according to at least some embodiments under stationary uniform traffic with different frame lengths. In a DGDA algorithm according to embodiments, both releasing and supplementing allocations are based on dichotomy order, which try to introduce least jitter after each adaptation. Even if the traffic changes, the dichotomy order may ensure that the new allocations of a port pair still have good jitter performance. Therefore, one good property of the dichotomy order is that it makes the jitter performance less susceptible to the variation of traffic. Considering the worst case scenario, the traffic of a port pair may obey Gaussian distribution, which is not self-similar at all, and the traffic of different port pairs of a group in a specific frame may also obey the same Gaussian distribution. Then, the time average jitter performance of a port pair is the same with the ensemble average jitter performance. That means, even if the traffic does not have strong dependency, the jitter performance may not be affected.

Diagram 400 compares the jitter performance 436 under various frame length scenarios against traffic load 438. Jitter in the long frame length case ($L_4$) is larger than that in the short frame length case ($L_1$). Jitter is almost zero when the number of cells in the queue equals to 0, 1, 2, but increases rapidly when the number of cells is increased to 3. When the number of cells exceeds 3, jitter mainly decreases with the increase of the number of cells. When the frame length equals 128 slots ($L_1$), the average number of cells per port pair is 128*load/32=4*load$\in$[0, 4]. Therefore, when the load is small, port pairs with 0, 1, 2 cells may dominate the population, thus leading to very small average jitter. With the increase of the load, the average jitter may increase because the number of incoming cells queued up in the port-pair become larger than 2. Likewise, when the frame length equals to 256 ($L_2$) and 512 ($L_3$) slots, jitter may increase with the increased traffic load at the beginning. When the load is increased to a certain value (e.g., 0.5 for the frame length $L_1=256$ slots, and 0.3 for the frame length $L_3=512$ slots), the dominating port pairs are no longer those with 0, 1, and 2 cells, and the average jitter almost remains constant. When the frame length is $L_4=1024$ slots, the average number of cells is 1024*load/32=128*load, which is larger than three even when the load is 0.2. The dominating port pairs among the population are those with more than three cells. Thus, the jitter is decreasing with the increase of the load when the number of cells exceeds three. Therefore, the average jitter keeps decreasing with the increase of the load when the frame length is $L_4=1024$ slots.

Figure 5:
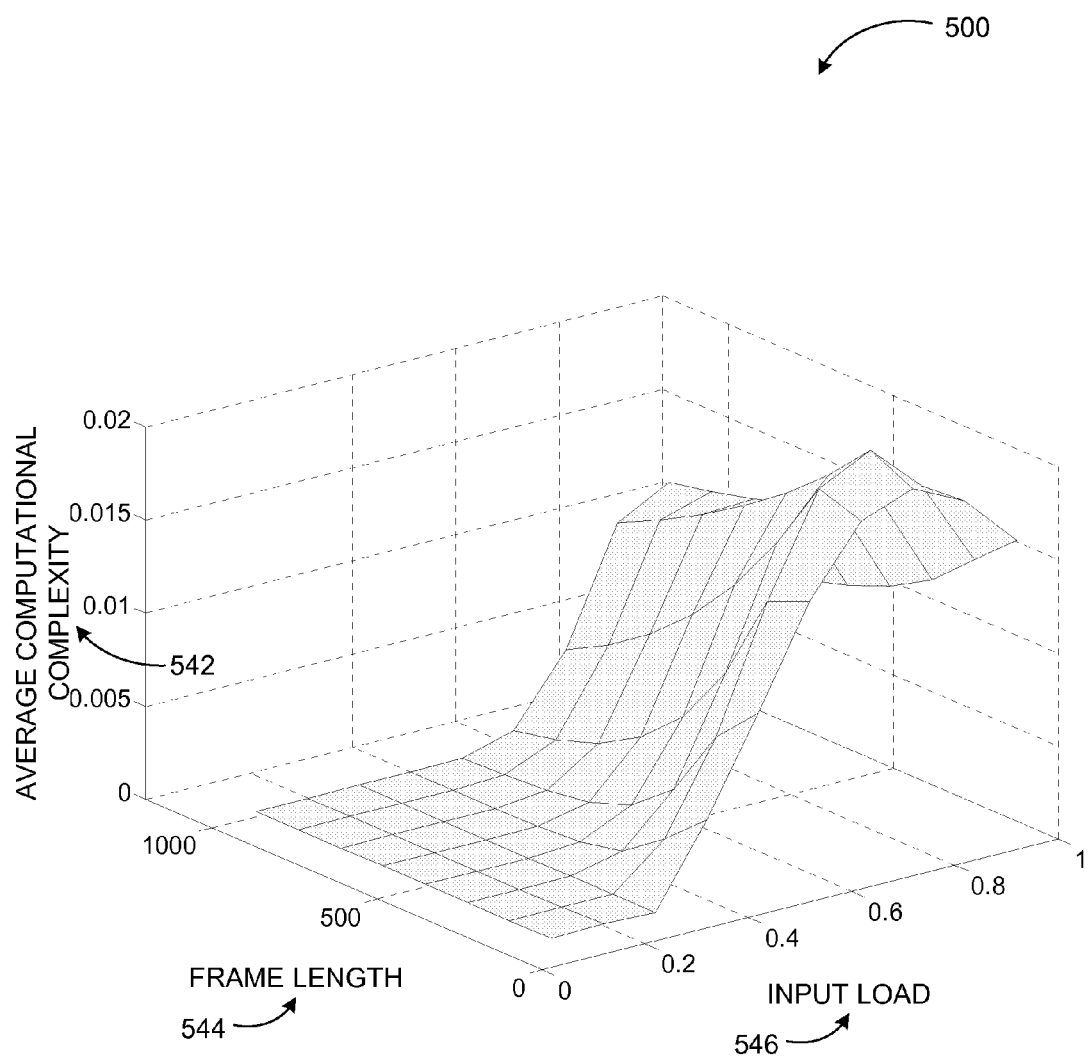
FIG. 5 illustrates a comparison of average computational complexity vs. frame length vs. input load in a system according to at least some embodiments under uniform traffic.

FIG. 5 illustrates a comparison of average computational complexity vs. frame length vs. input load in a system according to at least some embodiments under uniform traffic. The dedicated slots may be determined based on the statistical traffic arrival rate, which does not change with the variation of real-time traffic. Thus, the dedicated slots can be determined off-line. Once the dedicated slots are determined, the dichotomy order may be used in selecting the dedicated slots. The worst-case complexity of selecting dedicated slots is $O(N^2)$. The complexity of borrowing dedicated slots from other port pairs depends on the number of port pairs which need to borrow, and the slot checking range. In the worst case scenario, all port pairs may have to borrow, and each port pair may have to check all L slots. Thus, the worst-case complexity for borrowing dedicated slots is $O(N^2 \times L)$.

Hence, the computational complexities involved in steps (a), (b), and (c) of the example DDSA algorithm discussed above are $O(N^2)$. The bottleneck lies in step (d), where the worst-case complexity is $O(N^2 \times L)$. Therefore, the worst-case complexity of the overall DDSA algorithm may be considered as $O(N^2 \times L)$. In practical implementations, not all the port pairs have to borrow, and not all the slots have to be checked for a given port pair. When the network is with low traffic load, which may be the more common case, the number of port pairs which need to borrow is small. Thus, the likelihood of performing step (d) may be very small and the complexity can be as low as $O(N^2)$. When the network is heavily loaded, the number of port pairs which need to borrow is large, but many of the slots are ruled out of the checking range. Therefore, the worst-case complexity may not be needed.

In order to analyze the computational complexity, the expected number of the port pairs which need to borrow, denoted as E(nc), and the expectation of the slot checking range, denoted as E(lc) may be calculated. E(nc)*E(lc) may be used to estimate the average computational complexity. Intuitively, when E(nc) is large, E(lc) is small, and vice versa. To calculate the actual value, the statistical information of the incoming traffic is needed.

The cell arrivals of incoming traffic per time slot of every port pair may be assumed as i.i.d. Bernoulli, under both stationary and time-variant traffic scenarios from frame to frame. Then, the number of cells in a frame for a given port pair, corresponding to the sum of L Bernoulli arrivals, is a Binomial process. The incoming packets may be assumed to be dropped if they fail to be scheduled in the subsequent frame. Thus, a packet stays in the buffer for at most two frame durations.

With respect to the Binomial process, the population L is larger than 100, and the probability ρ/N is smaller than 0.05. Poisson distribution with expectation equaling to Lρ/N may be used to approximate the Binomial distribution in this scenario. For a given port pair, the probability of the number of incoming cells in a frame may be expressed as:

$$f_{T_{i,j}}(n) = e^{-L\rho/N}\frac{[L\rho/N]^n}{n!}, \forall\, i, j. \quad [6]$$

Hence, the expectation of the total number of port pairs which need to borrow E(nc) may be expressed as:

$$E(nc) = N^2 \left\{ \sum_{m=A}^{\infty}\left[p_{T^0}(m)\sum_{n=m+1}^{\infty} p_{T^1}(n)\right] + \sum_{m=A+1}^{\infty} p_{T^1}(m)\sum_{n=0}^{A-1} p_{T^0}(n) \right\} \quad [7]$$

$$= N^2 e^{-2L\rho/N}\left[\left(\sum_{m=L/N}^{\infty}\frac{(L\rho/N)^m}{m!} * \sum_{n=m+1}^{\infty}\frac{(L\rho/N)^n}{n!}\right) + \left(\sum_{m=L/N+1}^{\infty}\frac{(L\rho/N)^m}{m!}\right)*\left(\sum_{n=1}^{L/N-1}\frac{(L\rho/N)^n}{n!}\right)\right]$$

Diagram 500 shows the ratio of the average case complexity over the worst-case complexity $N^2*L$ (i.e., E(lc)/(L*E (nc)/$N^2$)). The axes in the three-dimensional diagram are average computational complexity 542, frame length 544, and input load 546. The largest ratio, which is below 0.02, is achieved when the input load is around 0.8. For a given frame length, E(nc) increases with the increase of the input load. When the input load is less than 0.7, E(nc) decreases with the increase of the frame length. When the input load is larger than 0.8, E(nc) increases with the increase of the frame length. When the normalized input load is less than 0.5, E(nc) is in the order of N, rather than $N^2$. The largest E(nc) with load ρ of 1 is smaller than $N^2/2$.

Figure 6:
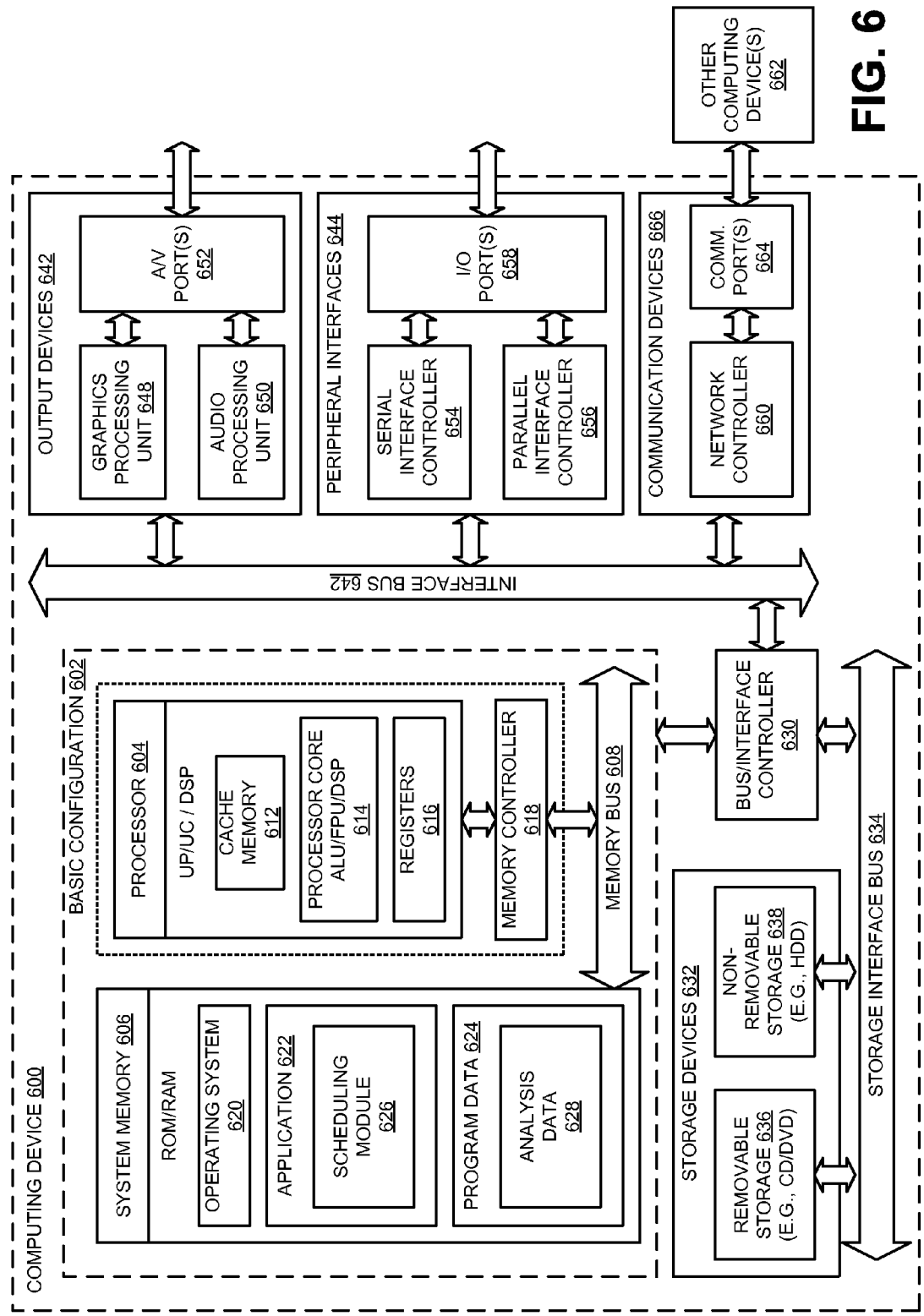
FIG. 6 illustrates a general purpose computing device, which may be used to implement differential frame based network traffic scheduling for input queued switches.

FIG. 6 illustrates an example general purpose computing device 600, which may be used to implement differential frame based network traffic scheduling for input queued switches arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a scheduling module 626 that is arranged to schedule input queued switches employing differential frame based scheduling and any other processes, methods and functions as discussed above. Program data 624 may include one or more of analysis data 628 (e.g. network traffic data, component characteristics, etc.) and similar data as discussed above in conjunction with at least FIG. 1 through 5. This data may be useful for determining optimized network traffic schedule for switches as is described herein. In some embodiments, application 622 may be arranged to operate with program data 624 on operating system 620 such that switch traffic is scheduled as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
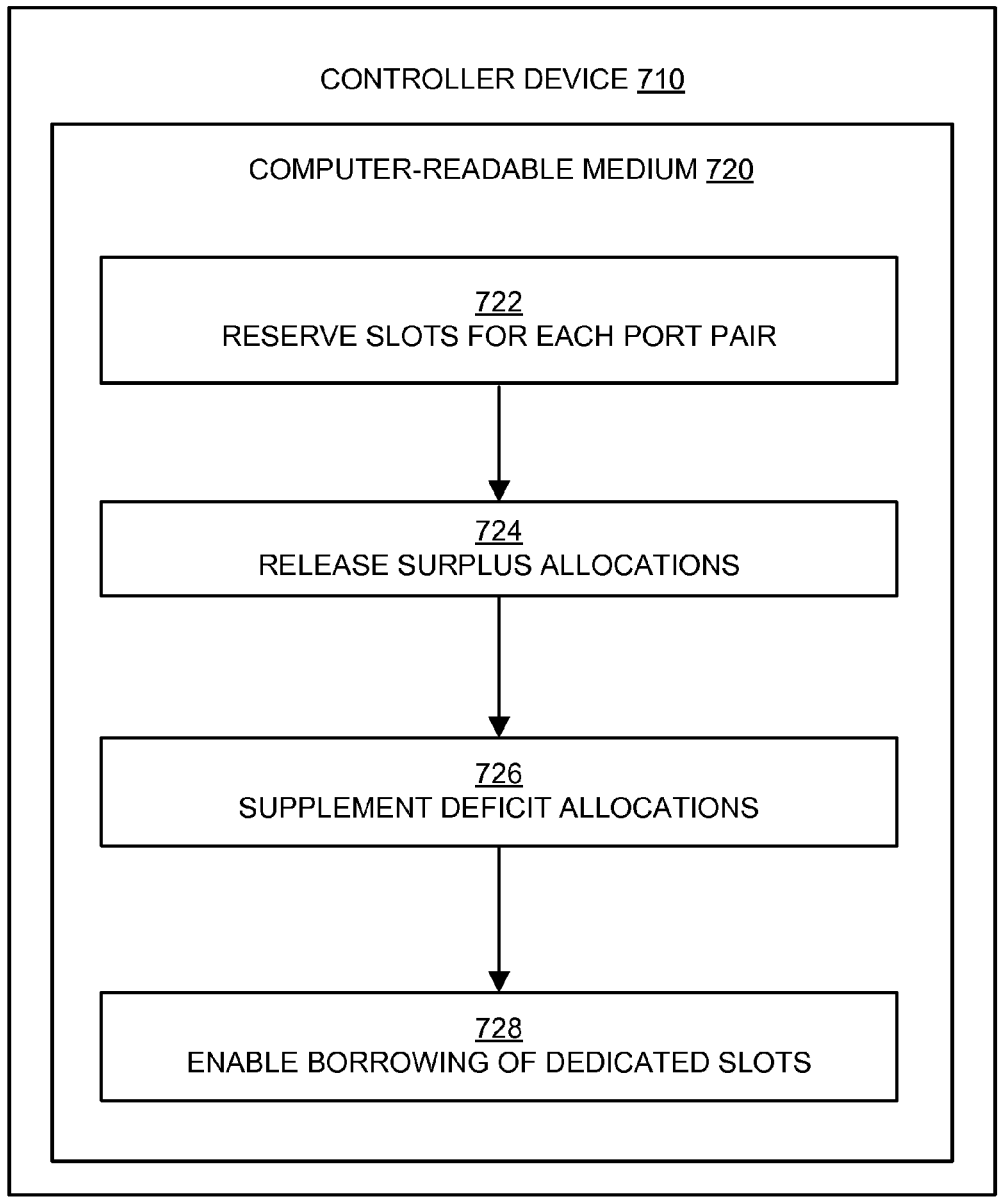
FIG. 7 is a flow diagram illustrating an example method for differential frame based scheduling for input queued switches that may be performed by a computing device such as device 600 in FIG. 6.

FIG. 7 is a flow diagram illustrating an example method for differential frame based scheduling for input queued switches that may be performed by a computing device such as device 600 in FIG. 6 in accordance with at least some embodiments. The operations described in blocks 722 through 726 may be stored as computer-executable instructions in a computer-readable medium such as the drives 640 of the computer 600.

A process of differential frame based scheduling for input queued switches may begin with operation 722, "RESERVE SLOTS FOR EACH PORT PAIR." At operation 722, port pairs such as port pair 102 in FIG. 1 may be grouped together and time slots reserved on a per group basis as shown in FIG. 1. The grouping may be performed by slightly modifying the low jitter decomposition. In low jitter decomposition, the traffic rate matrix may be decomposed into a combination of permutation matrices with the constraint of non-overlapping positions in permutation matrices.

Operation 722 may be followed by operation 724, "RELEASE SURPLUS ALLOCATIONS." At operation 724, surplus allocations may be selected among allocated time slots and released. The selection may be based on a dichotomy order. At operation 726 "SUPPLEMENT DEFICIT ALLOCATIONS" following operation 724, additional time slots, where the input and the output of the port pair are both idle, may be found to supplement deficit allocations. As in operation 724, a dichotomy order may also be adopted here for the purpose of low jitter, fairness as well as future differential implementation.

At operation 728 "ENABLE BORROWING OF DEDICATED SLOTS" following operation 726, port pair may be allowed to borrow time slots from other port pairs when necessary to improve throughput. When one port pair borrows dedicated slots from other port pairs, its scheduling interval may be decreased, and the jitter may decrease. Thus, a differential frame-based scheduling scheme for input-queued switches according to embodiments may help achieve low complexity, high throughput, and low jitter, which are key performance criteria for delay sensitive applications such as voice and video.

The operations included in the above described process are for illustration purposes. Differential frame based scheduling for input queued switches may be implemented by similar processes with fewer or additional operations. In some examples, the operations may be performed in a different order. In some other examples, various operations may be eliminated. In still other examples, various operations may be divided into additional operations, or combined together into fewer operations.

Figure 8:
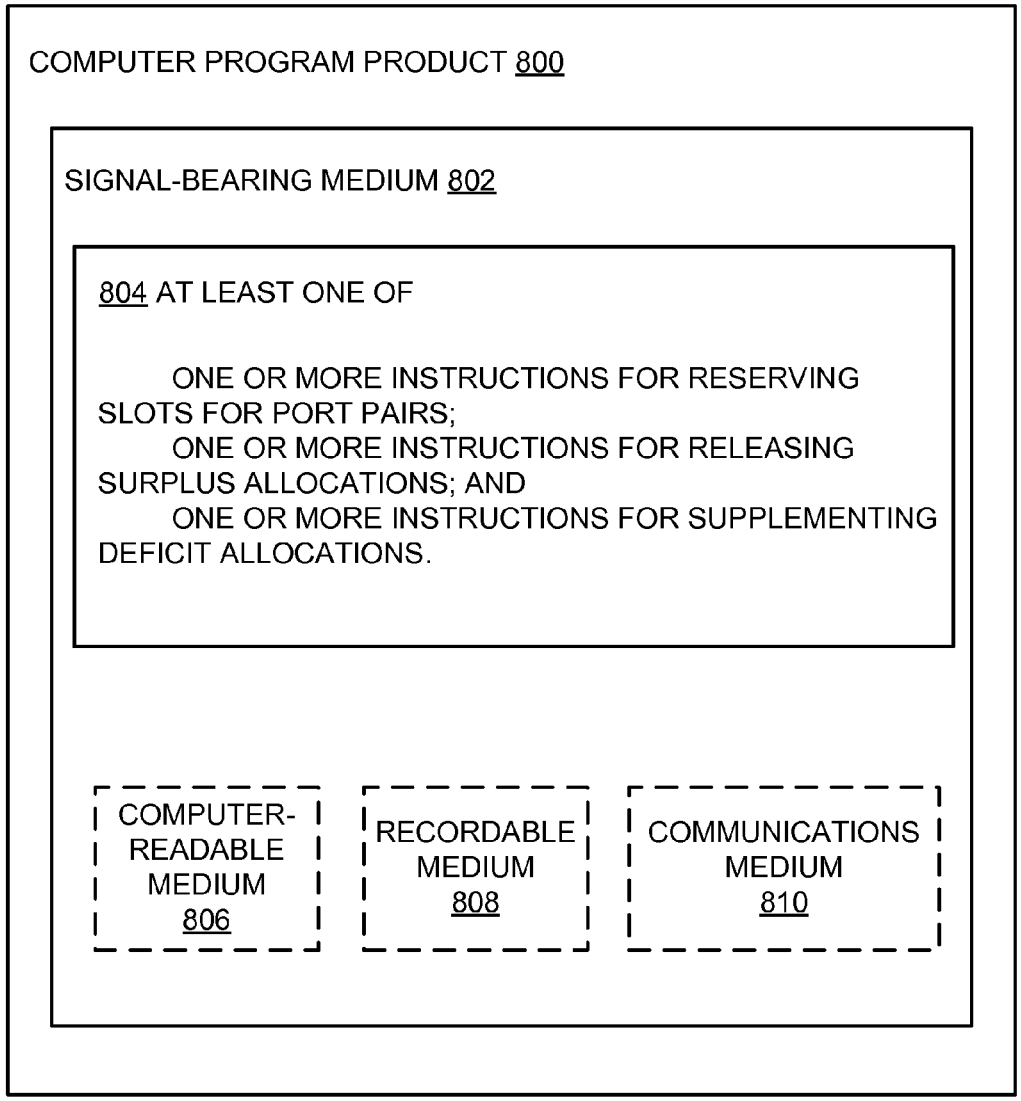
FIG. 8 illustrates a block diagram of an example computer program product, all arranged in accordance with at least some embodiments described herein.

FIG. 8 illustrates a block diagram of an example computer program product arranged in accordance with at least some embodiments described herein. In some examples, as shown in FIG. 8, computer program product 800 may include a signal bearing medium 802 that may also include machine readable instructions 804 that, when executed by, for example, a processor, may provide the functionality described above with respect to FIG. 6. Thus, for example, referring to the computing device 600, the scheduling module 626 may undertake one or more of the tasks shown in FIG. 8 in response to instructions 804 conveyed to the processor 604 by the medium 802 to perform actions associated with differential frame based scheduling for input queued switches as described herein. Some of those instructions may include reserving slots for port pairs, releasing surplus allocations, and supplementing deficit allocations.

In some implementations, the signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the processor 810 by an RF signal bearing medium, where the signal bearing medium 802 is conveyed by a wireless communications medium 810 (e.g., a wireless communications medium conforming with the IEEE 802.11 standard).

The present disclosure presents a method for scheduling input queued switches in a network environment. According to some embodiments, the method includes dedicating a predefined portion of available time slots to each switch port pair, where a switch port pair is not subject to scheduling constraints within its dedicated time slot and removing allocations of dedicated time slots according to a predefined order. The method may further include supplementing allocations of dedicated time slots according to the predefined order and enabling switch port pairs to borrow dedicated time slots of other switch port pairs.

According to other embodiments, the method may further include one or more of grouping the switch port pairs such that switch port pairs in a same group do not have same input or output; assigning dedicated time slots group by group, where switch port pairs with similar traffic demand are grouped into the same group, and then assigning the dedicated time slots based on traffic demands for the switch port pairs within each group; or using the dedicated time slots for scheduling in each frame such that a time involved in searching for suitable time slots is reduced. The time slots may be dedicated based on long-term statistical traffic arrival rate information.

According to further embodiments, the method may also include one or more of grouping the switch port pairs such that a total variance of traffic arrival rates for the switch port pairs is minimized; selecting the dedicated time slots based on a dichotomy order, where intervals between available time slots are determined and a time slot in a middle position of a maximum interval is selected; or letting switch port pairs with traffic requests exceeding a capacity of their dedicated time slots borrow dedicated time slots from other switch port pairs.

The present disclosure also presents an apparatus for scheduling input queued switches in a network environment. The apparatus may include a memory configured to store instructions and also store network information data associated with switch port pairs directing network traffic and a processor coupled to the memory, where the processor is adapted to execute the instructions, which when executed configure the processor to dedicate a predefined portion of available time slots to each switch port pair, where a switch port pair is not subject to scheduling constraints within its dedicated time slot and remove allocations of dedicated time slots according to a predefined order. The processor may also supplement allocations of dedicated time slots according to the predefined order and enable the switch port pairs to borrow dedicated time slots of other switch port pairs.

According to yet other embodiments, the processor may group the switch port pairs such that switch port pairs in a same group do not have same input or output and assign dedicated time slots group by group such that switch port pairs with similar traffic demand are grouped into the same group, and then assign the dedicated time slots based on traffic demands for the switch port pairs within each group. The processor may also use the dedicated time slots for scheduling in each frame such that a time involved in searching for suitable time slots is reduced, where the time slots may be dedicated based on long-term statistical traffic arrival rate information.

According to yet further embodiments, the processor may group the switch port pairs such that a total variance of traffic arrival rates for the switch port pairs is minimized and select the dedicated time slots based on a dichotomy order such that intervals between available time slots are determined and a time slot in a middle position of a maximum interval is selected. The processor may also let switch port pairs with traffic requests exceeding a capacity of their dedicated time slots borrow dedicated time slots from other switch port pairs and enable the switch port pairs first to take back dedicated time slots lent to other switch port pairs such that the switch port pairs are enabled to use their dedicated time slots with a highest priority.

The present disclosure further presents a computer-readable storage medium having instructions stored thereon for scheduling input queued switches in a network environment in a differential frame-based manner. The instructions may include dedicating a predefined portion of available time slots to each switch port pair, where a switch port pair is not subject to scheduling constraints within its dedicated time slot, and removing allocations of dedicated time slots according to a predefined order. The instructions may further include supplementing allocations of dedicated time slots according to the predefined order and enabling switch port pairs to borrow dedicated time slots of other switch port pairs.

According to some embodiments, the instructions may also include prioritizing a switch port pair that borrows earlier over another switch port pair that borrows later, enabling the switch port pairs first take back dedicated slots lent to other switch port pairs such that the switch port pairs are enabled to use their dedicated time slots with a highest priority, and normalizing a throughput for a total number of switch port pairs.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting time slot allocation matrices).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for scheduling input queued switches in a network environment, the method comprising:
    dedicating a predefined portion of available time slots to each switch port pair, wherein a switch port pair is not subject to scheduling constraints within its dedicated time slot;
    generating a predefined dichotomy order of allocations of dedicated time slots based on a circular array model;
    removing the allocations of dedicated time slots according to the predefined dichotomy order through one or more selections of opposite elements within the circular array model;
    supplementing the allocations of dedicated time slots according to the predefined dichotomy order through one or more selections of opposite elements within the circular array model;
    enabling switch port pairs to borrow dedicated time slots of other switch port pairs; and
    decreasing a scheduling interval of the switch port pairs to decrease a jitter associated with the switch port pairs when borrowing the dedicated time slots of the other switch port pairs.

2. The method according to claim 1, further comprising grouping the switch port pairs such that switch port pairs in a same group do not have same input or output.

3. The method according to claim 1, further comprising assigning dedicated time slots group by group, wherein switch port pairs with similar traffic demand are grouped into the same group, and then assigning the dedicated time slots based on traffic demands for the switch port pairs within each group.

4. The method according to claim 1, using the dedicated time slots for scheduling in each frame such that a time involved in searching for suitable time slots is reduced.

5. The method according to claim 4, wherein the time slots are dedicated based on long-term statistical traffic arrival rate information.

6. The method according to claim 1, further comprising grouping the switch port pairs such that a total variance of traffic arrival rates for the switch port pairs is minimized.

7. The method according to claim 1, further comprising selecting the dedicated time slots based on a dichotomy order, wherein intervals between available time slots are determined and a time slot in a middle position of a maximum interval is selected.

8. The method according to claim 1, further comprising letting switch port pairs with traffic requests exceeding a capacity of their dedicated time slots borrow dedicated time slots from other switch port pairs.

9. The method according to claim 8, further comprising enabling the switch port pairs first to take back dedicated time slots lent to other switch port pairs, such that the switch port pairs are enabled to use their dedicated time slots with a highest priority.

10. An apparatus for scheduling input queued switches in a network environment, the apparatus comprising:
    a memory configured to store instructions and also store network information data associated with switch port pairs directing network traffic;
    a processor coupled to the memory, wherein the processor is adapted to execute the instructions, which when executed configure the processor to:
        dedicate a predefined portion of available time slots to each switch port pair, wherein a switch port pair is not subject to scheduling constraints within its dedicated time slot;
        generate a predefined dichotomy order of allocations of dedicated time slots based on a circular array model;
        remove the allocations of dedicated time slots according to the predefined dichotomy order through one or more selections of opposite elements within the circular array model;
        supplement the allocations of dedicated time slots according to the predefined dichotomy order through one or more selections of opposite elements within the circular array model;
        enable the switch port pairs to borrow dedicated time slots of other switch port pairs; and decrease a scheduling interval of the switch port pairs to decrease a jitter associated with the switch port pairs when borrowing the dedicated time slots of the other switch port pairs.

11. The apparatus according to claim 10, wherein the processor is further configured to group the switch port pairs such that switch port pairs in a same group do not have same input or output.

12. The apparatus according to claim 10, wherein the processor is further configured to assign dedicated time slots group by group such that switch port pairs with similar traffic demand are grouped into the same group, and then to assign the dedicated time slots based on traffic demands for the switch port pairs within each group.

13. The apparatus according to claim 10, wherein the processor is further configured to use the dedicated time slots for scheduling in each frame such that a time involved in searching for suitable time slots is reduced.

14. The apparatus according to claim 13, wherein the time slots are dedicated based on long-term statistical traffic arrival rate information.

15. The apparatus according to claim 10, wherein the processor is further configured to group the switch port pairs such that a total variance of traffic arrival rates for the switch port pairs is minimized.

16. The apparatus according to claim 10, the processor is further configured to select the dedicated time slots based on a dichotomy order such that intervals between available time slots are determined and a time slot in a middle position of a maximum interval is selected.

17. The apparatus according to claim 10, the processor is further configured to let switch port pairs with traffic requests exceeding a capacity of their dedicated time slots borrow dedicated time slots from other switch port pairs.

18. The apparatus according to claim 17, the processor is further configured to enable the switch port pairs first to take back dedicated time slots lent to other switch port pairs such that the switch port pairs are enabled to use their dedicated time slots with a highest priority.

19. A computer-readable memory device having instructions stored thereon for scheduling input queued switches in a network environment in a differential frame-based manner, the instructions comprising:

dedicating a predefined portion of available time slots to each switch port pair, wherein a switch port pair is not subject to scheduling constraints within its dedicated time slot;

generating a predefined dichotomy order of allocations of dedicated time slots based on a circular array model;

removing the allocations of dedicated time slots according to the predefined dichotomy order through one or more selections of opposite elements within the circular array model;

supplementing the allocations of dedicated time slots according to the predefined dichotomy order through one or more selections of opposite elements within the circular array model;

enabling switch port pairs to borrow dedicated time slots of other switch port pairs; and decreasing a scheduling interval of the switch port pairs to decrease a jitter associated with the switch port pairs when borrowing the dedicated time slots of the other switch port pairs.

20. The computer-readable memory device of claim 19, wherein the instructions further comprise:

prioritizing a switch port pair that borrows earlier over another switch port pair that borrows later;

enabling the switch port pairs first take back dedicated slots lent to other switch port pairs such that the switch port pairs are enabled to use their dedicated time slots with a highest priority; and normalizing a throughput for a total number of switch port pairs.

\* \* \* \* \*

UNITED STATES PATENT AND TRADEMARK OFFICE
CERTIFICATE OF CORRECTION

PATENT NO. : 8,902,912 B2
APPLICATION NO. : 13/257305
DATED : December 2, 2014
INVENTOR(S) : Ansari et al.

Page 1 of 3

It is certified that error appears in the above-identified patent and that said Letters Patent is hereby corrected as shown below:

On the Title Page

On Page 2, (56), under "OTHER PUBLICATIONS", in Column 2, Line 9, delete "packetswitches,"" and insert -- packet switches," --, therefor.

On Page 2, (56), under "OTHER PUBLICATIONS", in Column 2, Line 40, delete "2004)," and insert -- 2004, --, therefor.

On Page 2, (56), under "OTHER PUBLICATIONS", in Column 2, Line 43, delete "et al," and insert -- et al., --, therefor.

On Page 2, (56), under "OTHER PUBLICATIONS", in Column 2, Line 45, delete "et al," and insert -- et al., --, therefor.

In the Drawings

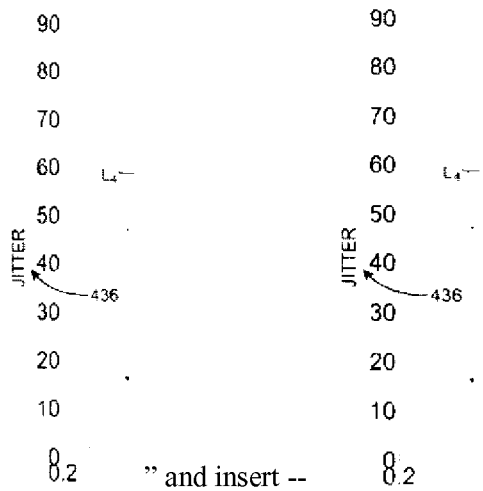

In Fig. 4, Sheet 4 of 8, delete "0.2" and insert -- 0.2 --, therefor.

Signed and Sealed this
Twenty-fifth Day of August, 2015

Michelle K. Lee
*Director of the United States Patent and Trademark Office*

In Fig. 6, Sheet 6 of 8, delete "INTERFACE BUS 642" and insert -- INTERFACE BUS 640 --, therefor.

In Fig. 6, Sheet 6 of 8, delete "UP/UC/DSP" and insert -- μP/μC/DSP --, therefor.

In the Specification

In Column 6, Line 11, in Eq. "[3]", delete "$\sum_{i=1}^{N} G_{i,j}^{k} = 1, \forall\ i, k.$" and insert -- $\sum_{j=1}^{N} G_{i,j}^{k} = 1, \forall\ i, k$ . --, therefor.

In Column 6, Line 16, delete "l₄," and insert -- $l_{i,j}$ --, therefor.

In Column 6, Lines 40-41, delete "$\left\lfloor L * r_k / \sum_{k=1}^{N} r_k \right\rfloor$ or $\left\lceil L * r_k \sum_{k=1}^{N} r_k \right\rceil$." and insert -- $\left\lfloor L * r_k / \sum_{k=1}^{N} r_k \right\rfloor$ or $\left\lceil L * r_k / \sum_{k=1}^{N} r_k \right\rceil$ . --, therefor.

In Column 7, Line 26, delete "(i j)" and insert -- (i,j) --, therefor.

In Column 8, Line 8, delete "% is" and insert -- % $\pi_{i,j}$ is --, therefor.

In Column 11, Lines 42-50, in Eq. "[7]".

delete "
$$E(nc) = N^2 \left\{ \sum_{m=A}^{\infty} \left[ p_{T0}(m) \sum_{n=m+1}^{\infty} p_{T1}(n) \right] + \sum_{m=A+1}^{\infty} p_{T1}(m) \sum_{n=0}^{A-1} p_{T0}(n) \right\}$$
$$= N^2 e^{-2L\rho/N} \left[ \left( \sum_{m=L/N}^{\infty} \frac{(L\rho/N)^m}{m!} * \sum_{n=m+1}^{\infty} \frac{(L\rho/N)^n}{n!} \right) + \left( \sum_{m=L/N+1}^{\infty} \frac{(L\rho/N)^m}{m!} \right) * \left( \sum_{n=1}^{L/N-1} \frac{(L\rho/N)^n}{n!} \right) \right]$$
" and

CERTIFICATE OF CORRECTION (continued)
U.S. Pat. No. 8,902,912 B2 insert -- $$E(nc) = N^2 \left\{ \sum_{m=A}^{\infty} \left[ p_{T^0}(m) \sum_{n=m+1}^{\infty} p_{T^1}(n) \right] + \sum_{m=A+1}^{\infty} p_{T^1}(m) \sum_{n=0}^{A-1} p_{T^0}(n) \right\}$$

$$= N^2 e^{-2L\rho/N} \left[ \sum_{m=L/N}^{\infty} \left( \frac{(L\rho/N)^m}{m!} * \sum_{n=m+1}^{\infty} \frac{(L\rho/N)^n}{n!} \right) + \left( \sum_{m=L/N+1}^{\infty} \frac{(L\rho/N)^m}{m!} \right) * \left( \sum_{n=1}^{L/N-1} \frac{(L\rho/N)^n}{n!} \right) \right]$$ --, therefor.

In Column 13, Line 7, delete "666" and insert -- 666) --, therefor.

In Column 13, Line 53, delete "(e.g., a LA/V, WA/V, or WLA/V)," and insert -- (e.g., a LAN, WAN, or WLAN), --, therefor.

In Column 15, Line 20, delete "processor 810" and insert -- processor 604 --, therefor.

In Column 17, Line 24, delete "and or" and insert -- and/or --, therefor.

In the Claims

In Column 21, Line 26, in Claim 16, delete "10," and insert -- 10, wherein --, therefor.

In Column 21, Line 31, in Claim 17, delete "10," and insert -- 10, wherein --, therefor.

In Column 21, Line 35, in Claim 18, delete "17," and insert -- 17, wherein --, therefor.